United States Patent
Thakrar et al.

(10) Patent No.: US 10,547,519 B2
(45) Date of Patent: Jan. 28, 2020

(54) SYSTEM AND METHOD OF ASSOCIATING METADATA WITH COMPUTING RESOURCES ACROSS MULTIPLE PROVIDERS

(71) Applicant: ServiceNow, Inc., Santa Clara, CA (US)

(72) Inventors: Utpal Thakrar, Goleta, CA (US); Yong Liang, Palo Alto, CA (US)

(73) Assignee: ServiceNow, Inc., Santa Clara, CA (US)

( * ) Notice: Subject to any disclaimer, the term of this patent is extended or adjusted under 35 U.S.C. 154(b) by 157 days.

(21) Appl. No.: 15/592,076

(22) Filed: May 10, 2017

(65) Prior Publication Data
US 2018/0123904 A1 May 3, 2018

Related U.S. Application Data

(60) Provisional application No. 62/416,520, filed on Nov. 2, 2016.

(51) Int. Cl.
*H04L 12/24* (2006.01)
*G06Q 10/06* (2012.01)
*H04L 29/08* (2006.01)

(52) U.S. Cl.
CPC .......... *H04L 41/22* (2013.01); *G06Q 10/067* (2013.01); *H04L 41/0803* (2013.01); *H04L 67/1002* (2013.01)

(58) Field of Classification Search
CPC ......... H04L 67/02; H04L 67/42; H04L 67/10; H04L 63/101; H04L 67/2842;
(Continued)

(56) References Cited

U.S. PATENT DOCUMENTS 7,940,756 B1  5/2011  Duffy et al.
2008/0235005 A1  9/2008  Golan et al.
(Continued)

OTHER PUBLICATIONS

BMC Support Central, "Creating Tag Groups and Tags", BMC Cloud Lifecycle Management 3.1—BMC Documentation, last modified Nov. 4, 2015, downloaded Oct. 19, 2016, https://docs.bmc.com/docs/display/public/clm31/Creating+tag+groups+and +tags, 4 pp.
BMC Support Central, "Assigning a Tag to an Object", BMC Cloud Lifecycle Management 3.1—BMC Documentation, last modified Nov. 4, 2015, downloaded Oct. 19, 2016, https://docs.bmc.com/docs/display/public/clm31/Assigning+a+tag+to+an+object, 2 pp.
(Continued)

*Primary Examiner* — Djenane M Bayard
(74) *Attorney, Agent, or Firm* — Fletcher Yoder PC

(57) ABSTRACT

Systems, apparatuses, and methods for modifying metadata associated with database objects obtained from providers, such as cloud providers, are disclosed. Modifying metadata associated with database objects obtained from cloud providers may include identifying resources in a computer network that originate from providers, such as cloud providers that do not have associated metadata. A user interface that includes the resources may be generated, and the resource may receive input to select the resources and a descriptor that may be associated with the resources. The selected resources may then be associated, in a configuration management dataset, with metadata derived from the selected descriptor. The metadata may indicate an association of the selected resources to a parameter.

19 Claims, 6 Drawing Sheets

(58) Field of Classification Search
CPC ... H04L 63/0815; H04L 63/102; H04L 63/20; H04L 67/1097; H04L 47/70; H04L 63/083; H04L 63/10; H04L 67/025; H04L 67/26; H04L 9/14; H04L 29/06; H04L 41/22; H04L 51/066; H04L 51/08; H04L 51/10; H04L 67/2804; H04L 67/306; H04L 67/32; H04L 67/327; H04L 9/0822; H04L 9/0861; H04L 9/0894; H04L 65/4084; H04L 65/601; H04L 65/604; H04L 65/608; H04L 63/123; G06F 8/433; G06F 8/71; G06F 11/3006; G06F 11/3082; G06F 11/3409
See application file for complete search history.

(56) References Cited

U.S. PATENT DOCUMENTS

| | | | |
|---|---|---|---|
| 2010/0319004 A1* | 12/2010 | Hudson | G06F 9/5072 719/313 |
| 2013/0212576 A1 | 8/2013 | Huang et al. | |
| 2014/0207861 A1* | 7/2014 | Brandwine | H04L 51/32 709/204 |
| 2014/0280961 A1 | 9/2014 | Martinez et al. | |
| 2016/0065489 A1 | 3/2016 | Bertram et al. | |
| 2016/0315995 A1* | 10/2016 | Hausler | H04L 67/02 |
| 2017/0093867 A1* | 3/2017 | Burns | H04L 63/101 |
| 2018/0041491 A1* | 2/2018 | Gupta | H04L 63/08 |

OTHER PUBLICATIONS

BMC Support Central, "Device Tags", BMC ProactiveNet Performance Management Reporting 9.0—BMC Documentation, Date Unknown, last modified Oct. 5, 2011, downloaded Oct. 21, 2016, https://docs.bmc.com/docs/display/public/bppmreporting90/Device+Tags, 1 page.

Editor, Data Tables, "Multi-Row Editing", Date Unknown, downloaded Oct. 21, 2016, https://editor.datatables.net/manual/multi-row, 6 pp.

Virtu-Alnet, "Automating Tags and Tag Category Creation and Assignment With PowerCLI", Powershell, VMWare, VMWorld, Nov. 13, 2014, downloaded Oct. 21, 2016, http://www.virtu-al.net/2014/11/13/automating-tags-tag-category-creation-assignment-powercli/, 6 pp.

VRealize Operations Manager 6.0.1 Documentation, "Creating and Assigning Tags", Customizing—How vRealize Operations Manager Monitors Your Environment, Managing Objects in Your Environment, Date Unknown, downloaded Oct. 21, 2016, https://pubs.vmware.com/vrealizeoperationsmanager-6/index.jsp?topic=%2Fcom.vmware.vcom.core.doc%2FGUID-A0A369A9-0BFD-4192-8B8C-3ACEBD9F2C68.html, 1 page.

Amazon Web Services, "Tagging Your Amazon EC2 Resources", Amazon Elastic Compute Cloud, Date Unknown, downloaded Oct. 21, 2016, http://docs.aws.amazon.com/AWSEC2/latest/UserGuide/Using_Tags.html, 12 pp.

* cited by examiner

SYSTEM AND METHOD OF ASSOCIATING METADATA WITH COMPUTING RESOURCES ACROSS MULTIPLE PROVIDERS

CROSS-REFERENCE TO RELATED APPLICATION(S)

This application claims the benefit of U.S. Provisional Application No. 62/416,520, filed Nov. 2, 2016, the disclosure of which is hereby incorporated by reference in its entirety.

TECHNICAL FIELD

The present disclosure relates in general to systems, methods, and apparatuses for modifying metadata associated with database objects obtained from distributed computing environments including cloud providers.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources can be hosted on distributed computing environments, including cloud computing environments. Such resources, which can include hardware resources (e.g. server devices) and software resources (e.g. database applications that operate on the server devices), can be used to provide a variety of services to end-users and the computing devices that interact with the distributed computing environment.

For example, a distributed computing environment can host an infrastructure that is used for Information Technology Operations Management ("ITOM"). By using a distributed computing environment such as a computing environment of one or more providers (e.g., cloud providers), the client computing devices, server computing devices, and networking devices included in the infrastructure can be managed in a more scalable fashion. In this way, resources can be provisioned on an as-needed basis that accommodates fluctuations in demand for those resources.

BRIEF DESCRIPTION OF THE DRAWINGS

The description herein makes reference to the accompanying drawings, wherein like reference numerals refer to like parts throughout the several views.

DETAILED DESCRIPTION

Figure 1:
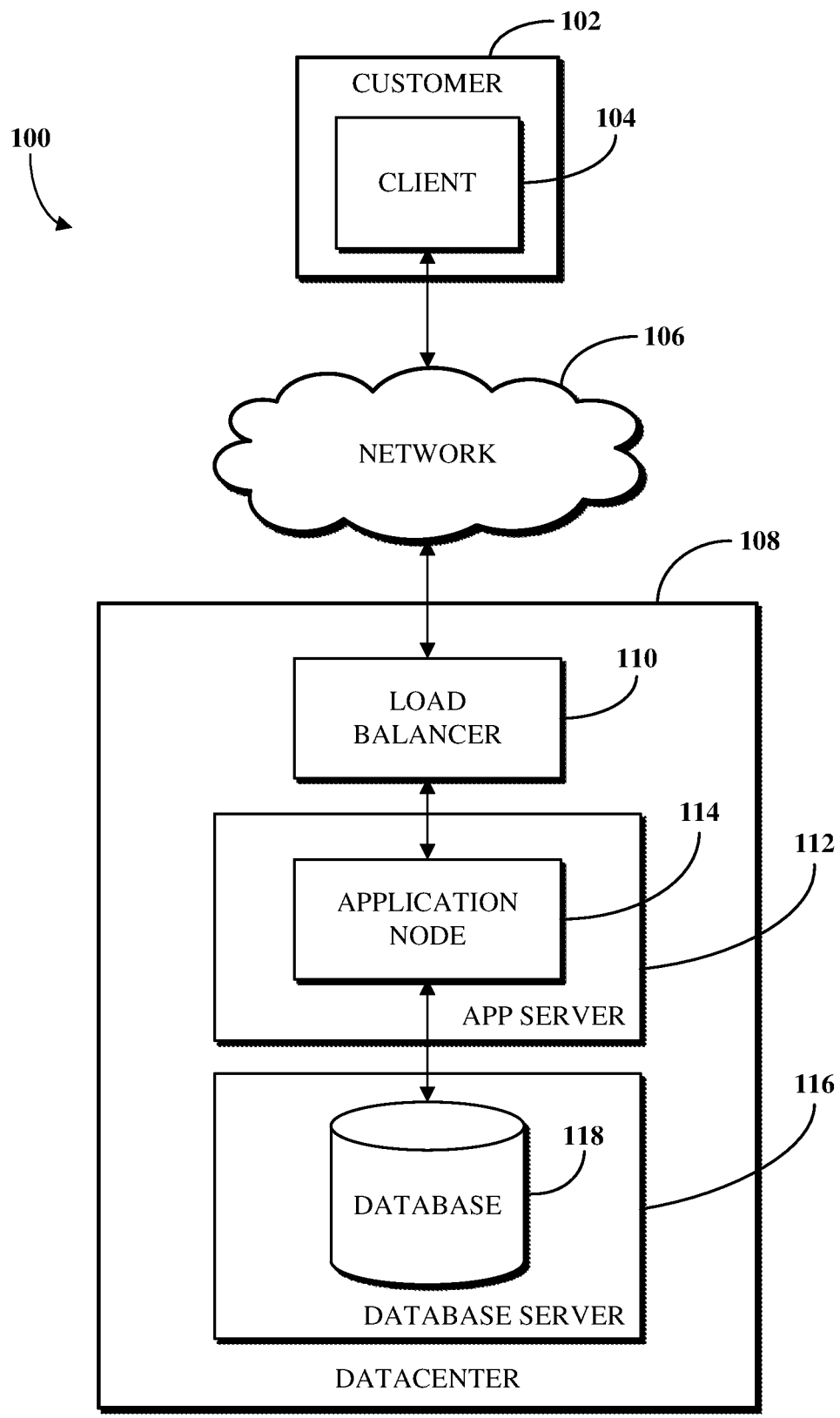
FIG. 1 is a diagram of an example of an electronic computing and communication system.

In distributed network computing environments, it is useful to provide declarative tags or other metadata for hardware and software resources provisioned by one or more providers. An example of such metadata includes tags associating a resource with a provider name, cost center, service, applications, or users. The additional information provided by metadata facilitates day-to-day management of the resources as well as reconstruction of systems when malfunctions or other disasters strike.

While metadata is useful, it is sometimes missing, incomplete or inaccurate. For example, when resources or computing infrastructure are provisioned by multiple providers, the providers may fail to use all of the desired metadata or may use metadata in different or inconsistent fashions. Also, pre-existing legacy resources, such as those within brownfield environments, may have missing, incomplete or inaccurate metadata in regards to projects, cost centers, services, applications, users, or the like. Adding, correcting and updating metadata such as tags is time-consuming work and prone to error.

The disclosed systems, methods, and non-transitory computer readable media, facilitate the association of complete, consistent, and accurate metadata to resources in a distributed network computing environment, including resources provisioned by one or more different providers. In accordance with the present technologies described in detail below, a system can perform discovery of a computer network to identify resources on the network. In some cases, the resources that are identified are those resources that have missing or incomplete metadata. This identification can be agnostic in the sense that resources are identified regardless of their provider or the provider of the platform on which they run. The system can generate a user interface that displays at least some of the identified resources and provides a mechanism for the user to select one or more of the displayed resources and to select one or more pieces of metadata. The system can associate the selected resources with the selected pieces of metadata. The metadata can indicate an association of the selected resources to a parameter which can include a service environment parameter relating to the provisioning of resources in a computing network.

For example, the operator of a computer network may wish to associate computer resources with a particular application to facilitate the management of that application. This association can be accomplished by the use of declarative tags or other metadata. For a variety of reasons, as explained above, some of the pertinent resources may lack tags associating the resource with the application. Also in accordance with the present technologies, resources can be identified, and a user interface that displays the resources can be generated with user-actuated indicia (for example) to select one or more of the resources. A drop down list (for example) of tags can be displayed, each describing an application (e.g., "payroll") to which resources may pertain and a mechanism by which the user can select one of the tags (i.e., applications). With the resources and tag selected, an implementation permits the user to associate, in bulk, the selected tag (e.g., "payroll") to the selected resources. Mechanisms can be provided to permit the user to select multiple tags, all of which can be associated in bulk to the selected resources.

To describe some implementations in greater detail, reference is first made to examples of hardware structures. FIG. 1 is a block diagram of an example of a system 100 in accordance with this disclosure. As used herein, the term "electronic computing and communication system," or variations thereof, can be, or include, a distributed computing system, such as a client-server computing system, a cloud computing system, a clustered computing system, or the like.

The system 100 can include one or more customers 102, which may be a public entity, private entity, or other corporate entity or individual that purchases or otherwise uses services of a software provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. The client 104 can be implemented as a single physical unit or a combination of physical units. Further, a single physical unit can include multiple clients.

The client 104 can be an instance of an application running on a customer device associated with the customer 102. As used herein, the term "application" can include, but is not limited to, applications, programs, instances, processes, threads, services, plugins, patches, application version upgrades, or any other identifiable computing unit capable of accessing or interacting, directly or indirectly, with a database. The system 100 can include any number of customers or clients or can have a configuration of customers or clients different from that generally illustrated in FIG. 1. For example, and without limitation, the system 100 can include hundreds or thousands of customers and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters and at least some of the datacenters can include hundreds or any suitable number of servers. The datacenter 108 can be associated or communicate with one or more datacenter networks or domains, which can include domains other than the client domain.

The client 104 and the servers associated with the datacenter 108 are configured to connect to, or communicate via, a network 106. Furthermore, a client 104 associated with the customer 102 can connect to the network 106 via a communal connection point, link, or path. A client 104 can be associated with the customer 102, and the client 104 can connect to, or communicate via, the network 106 using a distinct connection point, link, or path. A connection point, link, or path can be wired, wireless, or a combination thereof.

The network 106 can include, for example, the Internet. The network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, the load balancer 110 can instead be located outside of the datacenter 108, for example, when providing global routing for multiple datacenters. The load balancers can be included both within and outside of the datacenter 108.

The datacenter 108 can include an application server 112 and a database server 116. The application server 112 or the database server 116 can be a computing system, which can include one or more computing devices, such as a desktop computer, a server computer, or any other computer capable of operating as a server. The application server 112 or the database server 116 can be non-hardware servers implemented on a physical device, such as a hardware server. The application server 112 and the database server 116 can be implemented as a single hardware server or as a single non-hardware server implemented on a single hardware server. Any number of application servers or database servers can be implemented at the datacenter 108, and the datacenter 108 can include servers other than or in addition to the application server 112 or the database server 116, for example, a web server.

The application server 112 can include an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. As an example, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. The application nodes implemented on a single one of the application server 112 may run on different hardware servers.

The database server 116 can be configured to store, manage, or otherwise provide data for delivering services to the client 104 over a network. The database server 116 may include a data storage unit, such as a database 118, which can be accessible by an application executed on the application node 114. The database 118 may be implemented as database such as a relational database management system (RDBMS), an object database, an extensible markup language (XML) database, a configuration management database (CMDB), a management information base (MIB), one or more flat files, or other suitable non-transient storage mechanisms. By way of non-limiting example, the system 100 can include an XML database and a CMDB. While limited examples are described, the database 118 can be configured as or comprise any suitable database type. Further, the system 100 can include one, two, three, or any suitable number of databases configured as or comprising any suitable database type or combination thereof.

The database 118 can be configured as, or comprise, a CMDB. A CMDB can be comprised of a plurality of configuration items (CIs), attributes associated with the CIs, or relationships between CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the system 100 can be represented in the CMDB by a CI.

The CMDB can include information describing the configuration, the role, or both the configuration and the role, of an element of the system 100. The MIB can include one or more databases listing characteristics of the elements of the system 100. Further, an object identifier (OID) can represent object identifiers of objects or elements in the MIB.

One or more databases (e.g., the database 118), tables, other suitable information sources, or portions or combinations thereof, may be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. The systems and methods described herein, portions thereof, or combinations thereof, can be implemented on a single device, such as a single server, or a combination of devices, for example, a combination of the client 104, the application server 112, and the database server 116.

The system 100 can include devices other than the client 104, the load balancer 110, the application node 114, and the database server 116 as generally illustrated in FIG. 1. One or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; and a single database server catalog, such as a unitary MySQL catalog, can handle requests from multiple customers. In a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof, can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
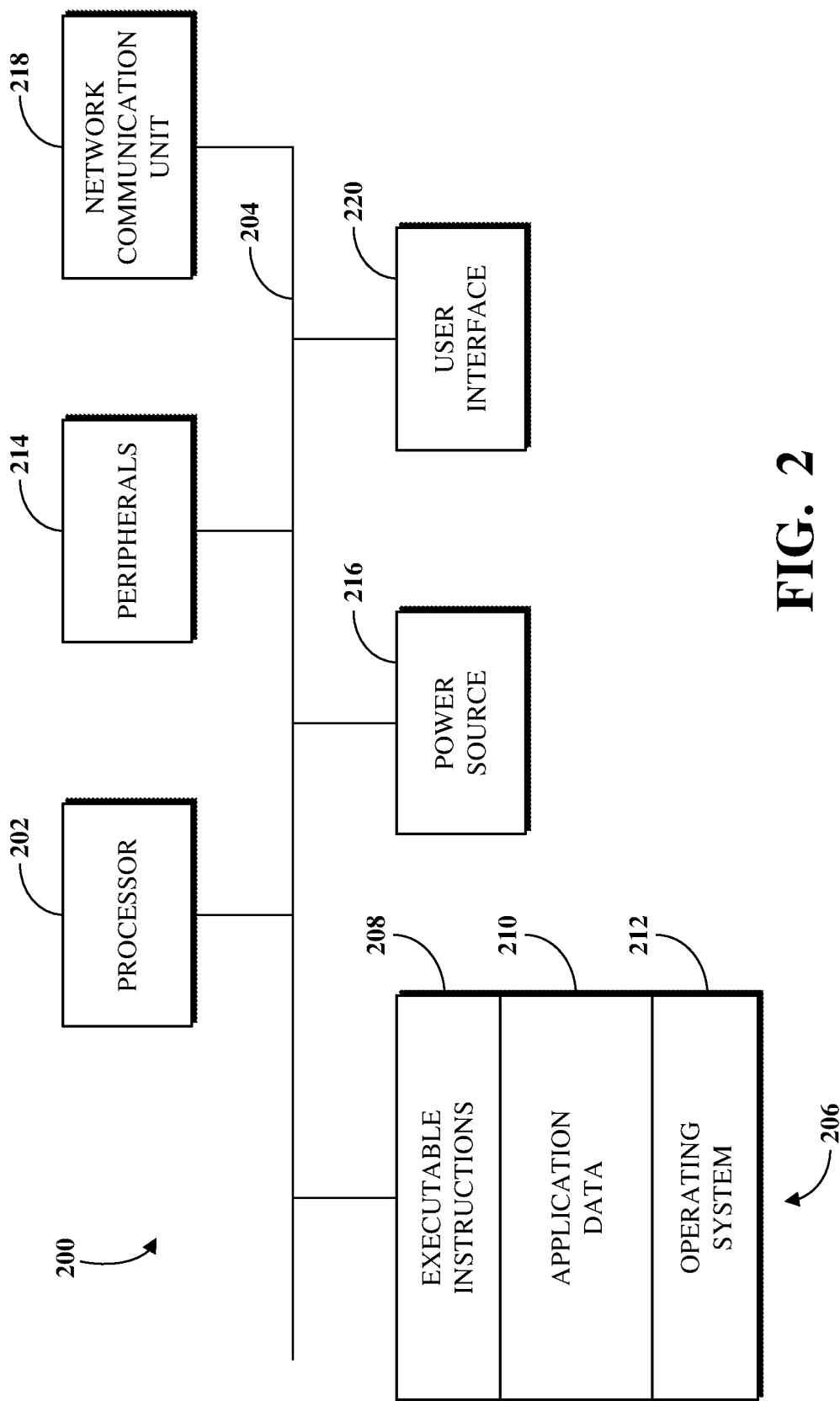
FIG. 2 is a block diagram of an example internal configuration of a computing device of the electronic computing and communication system shown in FIG. 1.

FIG. 2 generally illustrates a block diagram of an example internal configuration of a computing device 200, such as a client 104 or a server, such as an application server 112 or a database server 116, of the electronic computing and communication system 100 as generally illustrated in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now-existing or hereafter developed capable of manipulating or processing information. For example, the processor 202 can include multiple processors interconnected in any manner, including hardwired or networked, including wirelessly networked. The operations of the processor 202 can be distributed across multiple physical devices or units that can be coupled directly or across a local area or other suitable type of network. The processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR, SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now-existing or hereafter developed capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof, to perform various functions described herein. For example, the executable instructions 208 can include instructions to associate discovered resources of a computer network with metadata indicative of parameters, such as those identifying third-party computing providers from which those resources are made available. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200 as can be contemplated. The power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. The network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. The user interface 220 can include a display, which can be a liquid crystal display (LCD), a cathode-ray tube (CRT), a light emitting diode (LED) display, an organic light emitting diode display (OLED), or other suitable display.

A client or server can omit the peripherals 214. The operations of the processor 202 can be distributed across multiple servers and clients which can be coupled directly or across a local area or other suitable type of network. The memory 206 can be distributed across multiple servers and clients, such as network-based memory or memory in multiple servers and clients performing the operations of clients or servers. Although depicted here as a single bus, the bus 204 can be composed of multiple buses, which can be connected to each other through various bridges, controllers, or adapters.

Figure 3:
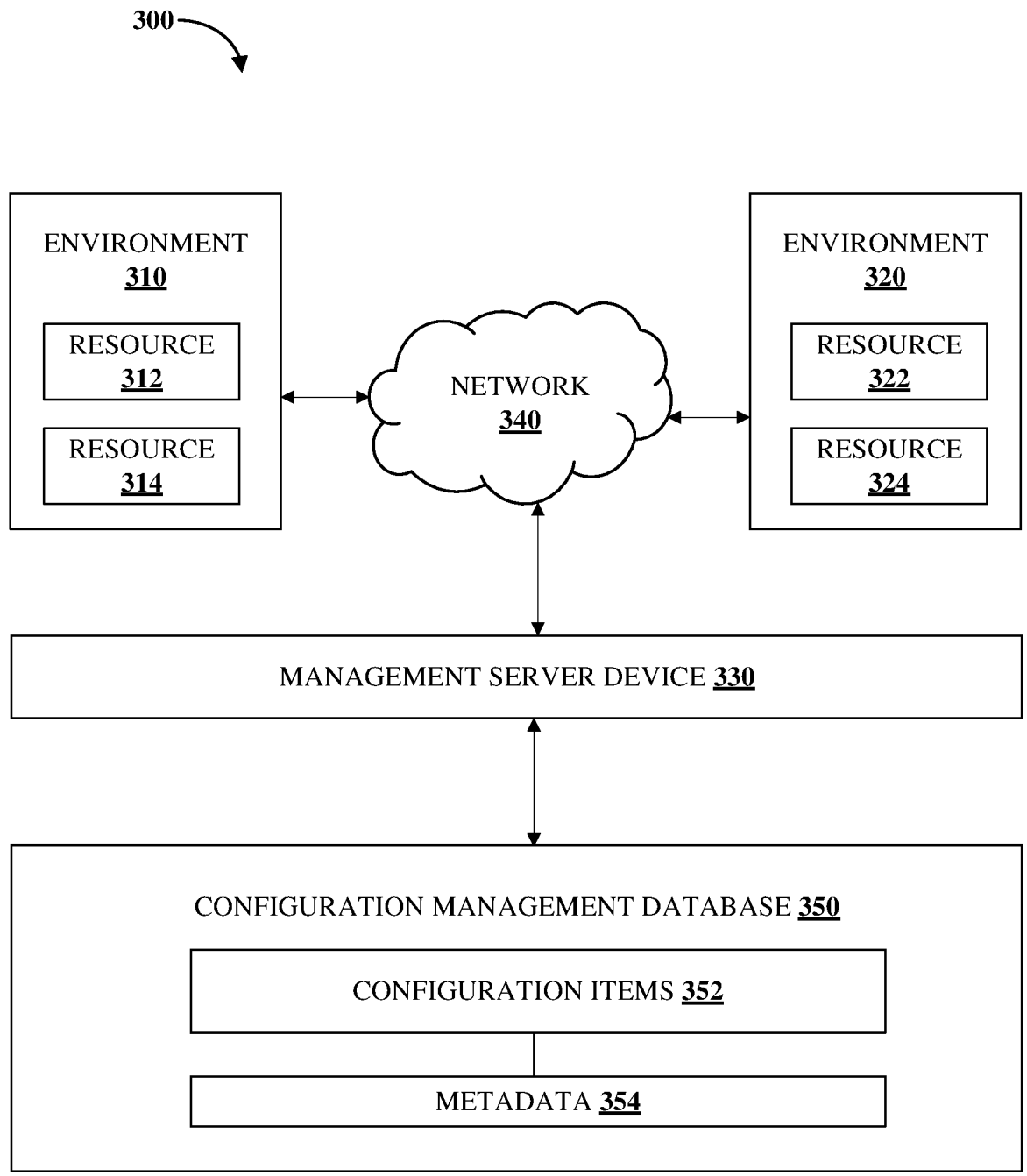
FIG. 3 is a diagram of an example of an electronic computing and communication system for modifying metadata associated with database objects obtained from providers.

FIG. 3 is a block diagram of an example of an electronic computing and communication system 300 for modifying metadata associated with database objects obtained from providers, such as cloud providers. As used herein, a "database object obtained from a provider" means a database representation (e.g., a configuration item in a configuration management dataset) of the resource (e.g., a resource 312, 314, 322, and/or 324) where the resource is provisioned from the provider as described with respect to FIG. 4.

The electronic computing and communication system 300 can include: one or more environments such as an environment 310, which includes the resource 312 and the resource 314; an environment 320, which includes the resource 322 and the resource 324; a management server device 330; and a network 340. The management server device 330 may include, or be in communication with, the configuration management dataset, including a CMDB 350. The CMDB 350 may include CIs 352 that may be associated with metadata 354. One or more of the environment 310, the environment 320, and the management server device 330 may exchange (transmit or receive) signals including messages, data, or packets, via the network 340. The management server device 330 can be, or can be operable in, the application node 114 of FIG. 1. The configuration management dataset can be (partially or completely), or can be part of, the database 118 of FIG. 1.

The environment 310 can include one or more resources, such as the resource 312 or the resource 314. The resources 312 and/or 314 may include a collection or grouping of hardware or software resources such as computing devices (e.g. server computing devices, client computing devices, networking devices) and software which may be used to represent a computing infrastructure which can exchange (transmit or receive) or store data, process events, or provide services to requesting devices.

As an example, the environments 310 and/or 320 may include a customer service environment which may be used to represent a customer service infrastructure such as a help desk environment, which may provide services, such as processing requests from client computing devices. The environments 310 and/or 320 can, partially or completely, result from provisioning of resources of a provider. A provider, such as a provider 430 and/or 440, is described further with respect to FIG. 4.

Resources, such as the resource 312, 314, 322, and/or 324, may include: hardware resources such as server computing devices, client computing devices, processors, memory, storage devices, networking devices, or power supplies; software resources including instructions executable by the hardware resources such as application software or firmware; virtual resources such as virtual machines or virtual storage devices; and storage constructs such as data files, data directories, or storage models. The resources may include a combination of physical resources or virtual resources.

The management server device 330 may provision, or cause to be provisioned by one or more providers, resources of the one or more providers to the environments 310 and/or 320. The resources of the providers can include applications, storage, network resources, servers, virtual servers, and the like. For example, the resource 312 of the environment 310 may be an application instance (i.e., an instance of an application resource), resulting from the provisioning (e.g., instantiating) of the application resource of a provider. As another example, the resource 314 may be a storage device allocated to the environment 310 from another provider. As such, an environment, such as the environment 310 and/or 320 may include or utilize resources from one or more providers.

The management server device 330 may create or modify metadata, such as tags, which may be associated with the resources in the environment 310 or the environment 320.

The management server device 330 may include, or be in communication with, a database such as the CMDB 350 which may include data such as the CIs 352. At least some of the CIs 352 may be associated with some of the metadata 354. The CMDB 350 may be populated based on, for example, a discovery process which may be used to discover resources. Further, the discovery process may include determining the properties (i.e., attributes) of resources such as the resources 312 or 314 in the environment 310. Some of the attributes can be associated to the resources via the metadata 354. Alternatively, or additionally, metadata 354 can be created based on the attributes.

The CMDB 350 may be organized as a database such as an RDBMS, an object-oriented database (e.g. an XML, database), a network model database, or a flat-file database. The CMDB 350 can be, or can be operable in, the database 118 of FIG. 1. The CIs 352 may include data indicating properties or attributes of the corresponding resources 312, 314, 322, and/or 324 including dependency relationships between resources 312, 314, 322, and/or 324. As an example, resources such as the resources 312 and 314 may be discovered by an agent software (such as an agent 422 of FIG. 4), which may operate as or in a separate device, in conjunction with the management server device 330, or on the management server device 330.

Figure 4:
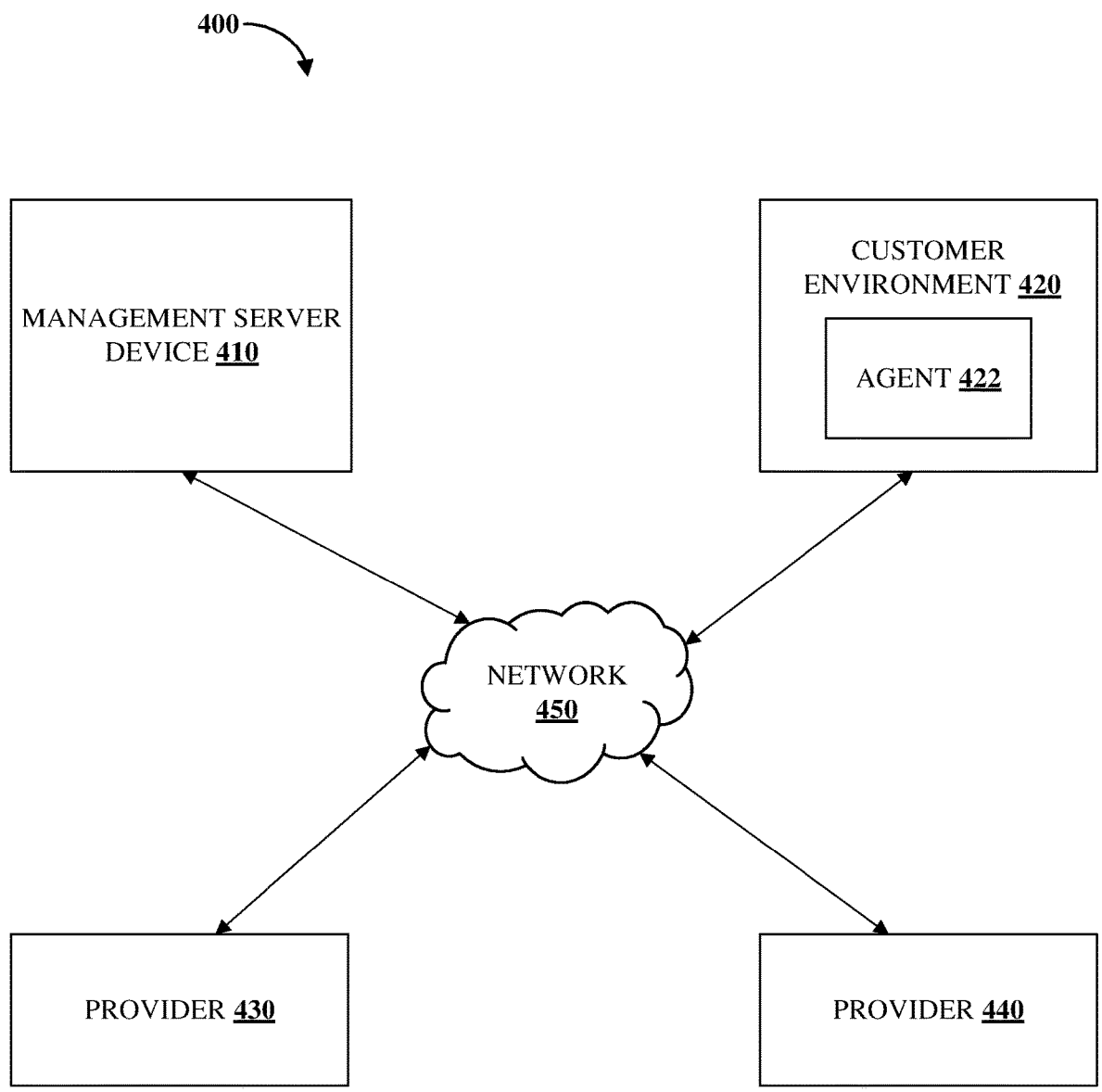
FIG. 4 is a diagram of an example of an electronic computing and communication system for modifying metadata associated with database objects obtained from providers.

FIG. 4 is a block diagram of an example of an electronic computing and communication system 400 for modifying metadata associated with database objects obtained from providers, such as cloud providers.

The electronic computing and communication system 400 can include: a management server device 410; a customer environment 420, which can include the agent 422; a provider 430; and a provider 440. The management server device 410, the customer environment 420, the provider 430, and the provider 440 may exchange (send or receive) communication traffic such as signals, messages, or packets, via a network 450. The management server device 410 can be the management server device 330 of FIG. 3.

The provider 430 and/or 440 provides resources that can be shared and/or accessed via the Internet. The provider 430 and/or 440 can be a cloud provider. The provider 430 and/or 440 can have and/or manage a large number of computing devices that are configured to execute various programs, such as application servers, web servers, or database servers. Computing resources provided by the provider 430 and/or 440, such as application, storage, and network resources can be provisioned, allocated, instantiated, or otherwise made available (collectively referred to as "provisioning" or "provision") to a customer (such as the customer 102 of FIG. 1) on one or more computing devices of the computing infrastructure of the provider. A provider can be a platform-as-a-service (PaaS), an infrastructure-as-a-service (IaaS), a software-as-a-service (SaaS), or the like, provider.

The customer environment 410 can include networks and/or devices controlled (wholly or partially) by a customer, such as the customer 102 of FIG. 1. The customer can be, for example, a customer of a provider. For example, the customer environment can include networks, devices, and/or software under the control of a customer operating an infrastructure-as-a-service (IaaS) service, for example, cloud computing instances implemented using resources of the provider 430 and/or 440, but controlled by the customer. The customer environment can include the environment 310 and/or 320 of FIG. 3.

The agent 422 can be configured to communicate, via the network 450, with the management server device 410 on a periodic or non-periodic (e.g., event triggered) basis to retrieve commands and information provided by the management server device 410 and to be processed by the agent 422. For example, the agent 422 can send a request to the management server device 410 every predetermined time period (e.g., every 60 seconds) requesting that the management server device 410 transmit any messages awaiting receipt or processing by the agent 422. The command can be a command to perform a discovery activity. The agent 422 can return the result of the discovery activity to the management server device 410. The result can include information (e.g., metadata or tags) regarding a resource (e.g., the resource 312, 314, 322, and/or 324), an environment (e.g., the environment 310 and/or 320), or a combination therefore. The result can include other information.

The management server device 410 may manage resources that are maintained by the customer environment 420, the provider 430, or the provider 440 via the network 450. The management server device 410 may exchange data with a provider, such as a cloud provider, the provider 430, or the provider 440, in order to determine the application programming interface (API) that is used by the respective provider. The management server device 410 may then perform activities including discovering, provisioning, allocating, or modifying resources, such as the resources 312, 314, 322, and/or 324, in the customer environment 420, the provider 430, or the provider 440.

The management server device 410 can use templates for providers 430 and/or 430 to discover, provision, allocate, or modify respective resources in the customer environment 420. A template can include one or more APIs of the respective provider for obtaining, and/or setting, information associated with one or more resources in the customer environment 420. An administrator or other user of the customer environment 420 can generate or otherwise define a template for a resource (e.g., the resource 312, 314, 322, and/or 324 of FIG. 3), or an environment (e.g., the environment 310 and/or 320 of FIG. 3) of the customer environment 420 using information stored in a CMDB, such as the CMDB 350 of FIG. 3, of the customer environment. The information stored in the CMDB (i.e., CMDB information) can include CIs 352 of FIG. 3. The CMDB information can provide a link between how resources are identified within the customer environment 420 and how they are identified by a provider (e.g., the provider 430 or 440). Generating or otherwise defining a template for a resource may include selecting values from a list of CMDB information to be associated with API calls made to a provider. The management server device 410 can use the selected values of a template to automate the identification of a resource within the CMDB based on information obtained from API calls made to a provider.

As described above, the agent 422 in the customer environment 420 can perform activities in the customer environment 420 in response to a request by a user (such as a user of the customer environment 420 or a user of the management server device 410) or another entity such as another agent or software application. As an example, the agent 422 may receive a query requesting the identity of a user authorized to access a particular resource or a query for the identity of the API that is used by a resource to access a particular provider. In response to the query, the agent 422 may then determine the user identity or API identity and provide a response to the management server device 410.

The providers 430 and 440 may include distributed computing resources such as cloud resources that include network services (e.g. applications) or infrastructure (e.g. storage devices) that are accessible through a computer network such as the network 450.

Figure 5:
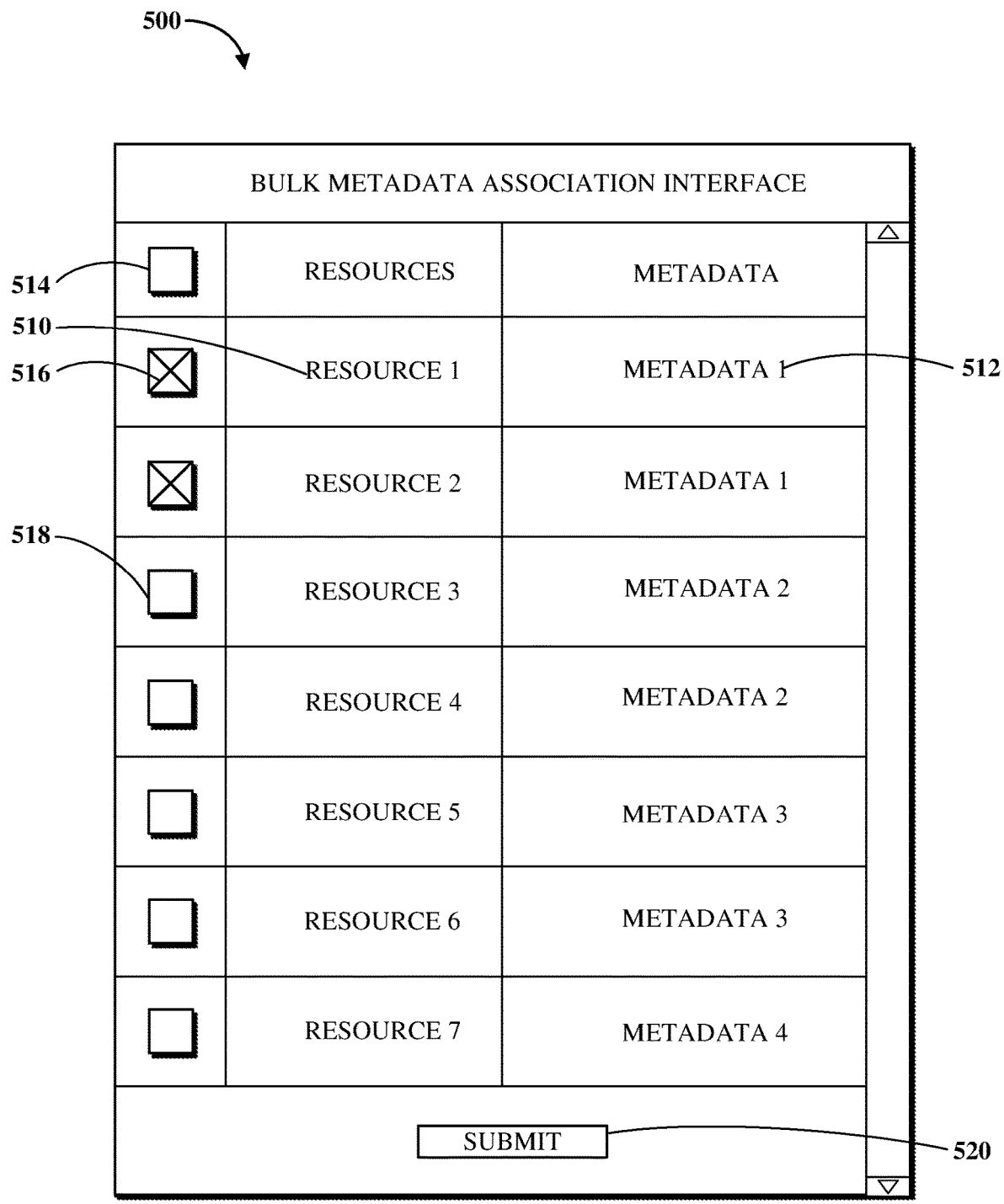
FIG. 5 is diagram of an example of an interface for a method for modifying metadata associated with database objects obtained from providers.

FIG. 5 is a diagram of an example of an interface 500 for modifying metadata associated with database objects obtained from providers such as cloud providers.

The interface 500 for modifying metadata associated with database objects obtained from a provider, such as the provider 430 and/or 440 of FIG. 4, can include at least one of: a resource descriptor 510; a metadata descriptor 512; an aggregate selection indicator 514 to indicate that all of the resources and associated metadata are selected; a selection indicator 516 to indicate that one resource and associated metadata are selected; an unselected indicator 518 to indicate that one resource and associated metadata are not selected; and a bulk metadata submission control 520 to initiate bulk association of the metadata to the selected resource indicators such as the resource descriptor 510.

The interface 500 may be generated based on one or more instructions, which may be stored in a server computing device. As an example, the interface for a web page may be generated by a server computing device, based on instructions that include hypertext markup language (HTML), which may be interpreted by a client computing device that accesses the server computing device and generates a graphical representation of the interface 500 on an output device such as an LCD monitor. The elements of the interface 500 may be based on data associated with the condition or status of resources, such as the resources 312, 314, 322, and/or 324 of FIG. 3, such as may be determined based on processes such as a network discovery process or through querying one or more configuration item tables in a CMDB, such as querying the CIs 352 of the CMDB 350 of FIG. 3.

A resource indicator, such as the resource descriptor 510 may be associated with a resource (e.g., the resource 312, 314, 322, and/or 324 of FIG. 3) in an environment (e.g., the environment 310 and/or 320 of FIG. 3). Some of the elements indicated in the interface 500, such as the aggregate selection indicator 514, may be selected by a user to indicate that the resource corresponding to the resource descriptor 510 will be associated with the metadata descriptor 512. Metadata indicators such as the metadata descriptor 512 may receive input to select metadata to associate with the corresponding resource. As an example, the metadata descriptor 512 indicates that a "METADATA 1" will be associated with the "RESOURCE 1" indicated by resource descriptor 510. However, different metadata (not shown) may be selected based on a user interaction such as clicking and selecting different metadata from a drop down list. The resource descriptor 510 may correspond to a resource descriptor that is not exactly the same as the resource descriptor 510 (e.g. "resource 001445" may correspond to "resource 001445" as well as "resource 001445"). Moreover, the metadata descriptor 512 may correspond to a resource descriptor that is not exactly the same as the metadata descriptor 512. For example, even though the value "METADATA 1," is displayed in and/or can be selected through the interface 500, the value "METADATA 1" may correspond to a value "meta-542" with respect to a provider (e.g., the provider 430 of FIG. 4) as well as to "metadata 542" with respect to another provider (e.g., the provider 440 of FIG. 4). "Correspond" can mean converted to, mapped to, looked up by provider, or the like. The displayed value "METADATA 1" can be corresponded to a provider-specific value via a respective API of the provider.

Selecting the metadata descriptor 512 may generate a listing of a predetermined metadata that may include at least one of: providers; cost centers; departments; projects; services; applications; and users. The user may then select and click on one or more applicable predetermined metadata, thereby indicating that the predetermined metadata selected by the user will be associated with the corresponding resource. For example, to associate a "cost center" metadata with a resource (e.g., the resource 322 of FIG. 3) corresponding to the resource descriptor 510, the user may select the metadata data descriptor 512 to generate a listing of predetermined metadata which includes the "cost center" metadata. The user can then select the "cost center" predetermined metadata and provide a value, e.g., "VR R&D." As such, upon invoking the bulk metadata submission control 520, the metadata "cost center" having the value "VR R&D" can be associated to the resource. By providing the user with predetermined metadata, the selectable metadata descriptions can be consistent across resources included in the interface 500.

The aggregate selection indicator 514 may be used to select all of the resource indicators presented in the interface 500. Association of metadata to some or all of the selected resources may be initiated through a user interaction with the bulk metadata submission control 520.

Figure 6:
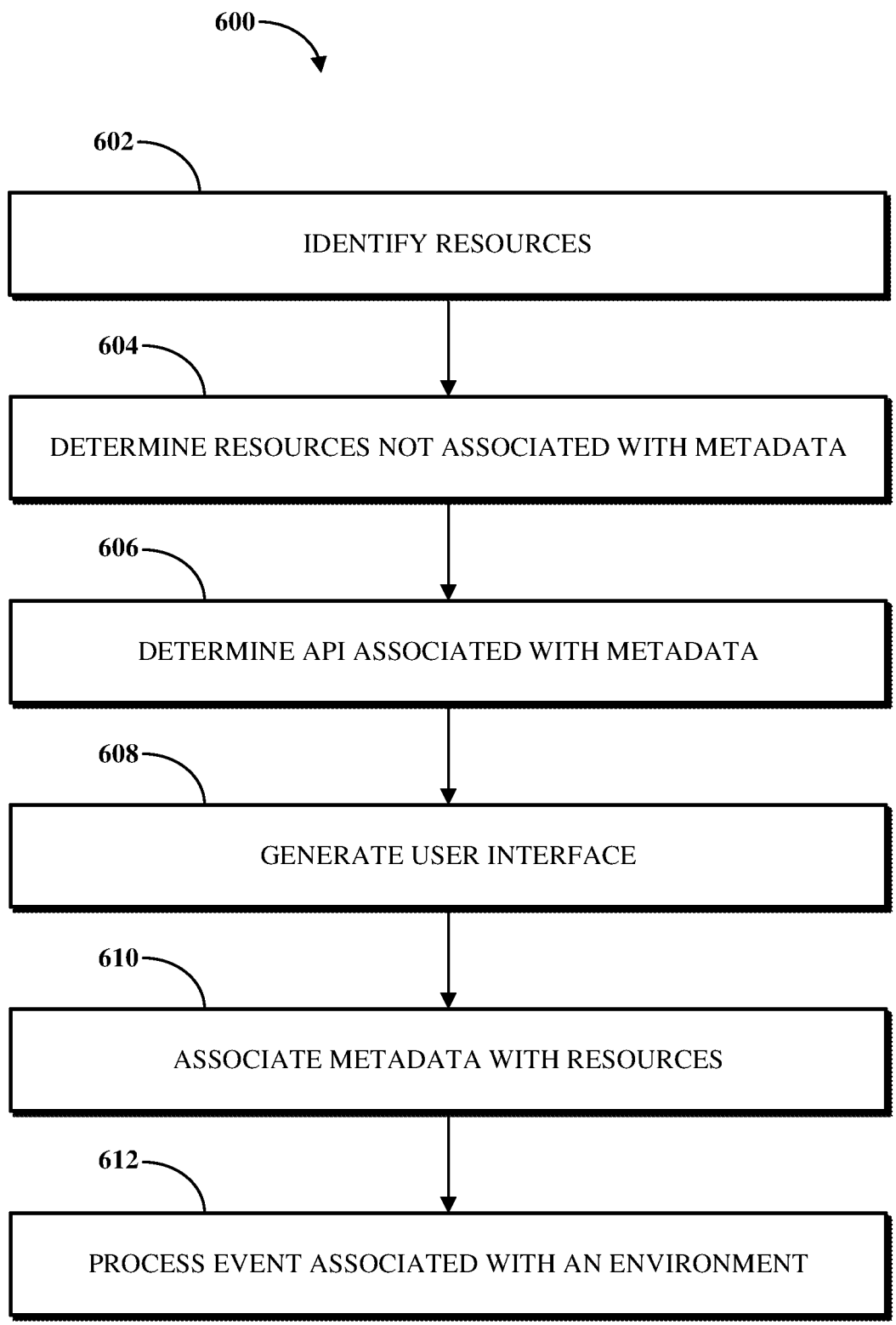
FIG. 6 is a logic flow chart illustrating an example of a method for modifying metadata associated with database objects obtained from providers.

FIG. 6 is a flowchart of a technique 600 for modifying metadata associated with database objects obtained from providers, such as cloud providers, in an electronic computing and communication system, such as the system 100 of FIG. 1. A technique 600 can be executed using computing devices, such as the systems, modules, and devices described with respect to FIGS. 1, 2, 3, 4, and 5. The technique 600 can be performed, for example, by executing a machine-readable program or other computer-executable instructions, such as instructions or programs described according to JavaScript, C, or other such instructions. The steps, or operations, of the technique 600 or any other method, process, or algorithm described in connection with the implementations disclosed herein can be implemented directly in hardware, firmware, software executed by hardware, circuitry, or a combination thereof.

The technique 600 can include: identifying resources at operation 602; determining the resources that are not associated with metadata at operation 604; determining the APIs associated with the metadata at operation 606; generating a user interface at operation 608; associating metadata with resources at operation 610; and processing an event associated with an environment at operation 612.

At operation 602, in response to the performance of a network discovery of a computer network, a set of resources (e.g., the resources 312, 314, 322, 324 of FIG. 3 or a subset thereof) is identified within a computer network. The network discovery may include exchanging (sending or receiving) signals, such as data packets, through the computer network, to determine the existence, status, attributes, and/or identity of any resources connected to the network. The computer network may include a variety of different providers that provide different subsets of the resources and the different providers may include cloud storage providers or cloud services providers. As an example, the set of resources can include a subset of resources of the set of resources that can originate from a provider and another subset of resources of the set of resources that can originate from another provider. For example, the subset of resources can include the resource 312 which can have originated from the provider 430; and the other subset of resources can include the resource 314 which can have originated from the provider 440. Further, additional sets of resources can originate from a combination including the same provider or a different provider. For example, the subset of resources can include the resources 312, 322, and 324 which can have originated from the provider 430; and the other subset of resources can include the resource 314 which can have originated from the provider 440.

At operation 604, a set of resources, such as the set of resources that is not associated with metadata, such as a tag, is determined. The determination of which resources do not have metadata may include: comparing data associated with a resource to stored data. The data associated with the resource can include the attributes of the resource obtained via the operation 602. The stored data can be records in a configuration management dataset (e.g. a database, such as a CMDB 350 of FIG. 3). The stored data can include a listing of resources and associated metadata that describe the state of the resources including a stored status, stored attributes, or a stored identity of the resources. The listing of resources can include configuration items corresponding to the resources. The stored status, stored attributes, and/or stored identity of a resource may be different than the status, attributes, and identity obtained via the operation 602.

The technique 600 may determine, via the operation 604, that the resource (e.g., the resource 312 of FIG. 3) corresponding to the resource descriptor 510 of FIG. 5 is not associated with metadata. A resource is determined not to be associated with metadata if, for example, the resource is associated with metadata that is not appropriate for the resource; the metadata is incomplete (e.g., the resource is associated with a "department" metadata but is not associated with a "cost center" metadata); no metadata is associated with the resource; or the resource is associated with metadata that is to be modified (e.g., the resource is associated with the metadata "cost center" having a value of "R&D VR" which is to be modified to "Marketing, Western Europe." Other semantics for determining that a resource has no metadata can be available.

The resource descriptor 510 can correspond to a resource (e.g., the resource 312, 314, 322, and/or 324 of FIG. 3) determined via the operation 604. The metadata descriptor 512 of FIG. 5 can display the metadata of the resource as stored in the stored data. The metadata descriptor 512 can display discrepancies between the stored data and properties of the resource obtained (e.g., differences) via the operation 602. Other information can be displayed in or by the metadata descriptor 512.

Resources without metadata may be determined by querying the resources (directly or indirectly), such as with polling, or through an agent associated with the computer network for the identity of the resources within the computer network. For example, an agent, such as the agent 422 of FIG. 4, may be configured to search for resources, determine whether the resource is associated with metadata, and return a response to a query requesting the status of metadata for a resource or collection of resources in an environment such as a service environment.

At operation 606, an API, or an identity of an API, associated with the metadata may be determined based on a comparison of attributes of the configuration item data to attributes associated with resources, such as the set of resources. As an example, the attributes of the configuration item data may include at least one of an entity (e.g., a user or a group) authorized to access resources and a lease attribute to indicate a time interval of resource availability. Other attributes can be available. The configuration items data can include constraint information such as, for example, a maximum metadata length attribute including an indication of a maximum length of a metadata attribute, a minimum metadata length attribute including an indication of a minimum length of a metadata attribute, a string format attribute to indicate that the metadata attribute is in the form of a string, a metadata number format attribute to indicate the number format (e.g. integer or floating point) of metadata, or other constraints. For example, a constraint can indicate that for a first provider (e.g., the provider 430 of FIG. 4), a resource (e.g., the resource 314 of FIG. 3) can have no more than ten metadata assigned. For example, a constraint can indicate that for a second provider (e.g., the provider 440 of FIG. 4), attributes cannot be prefixed with the value "xyz:." For example, a constraint can indicate that the maximum length of a metadata attribute for the second provider is 255 characters.

The identity of the API may be determined by: querying a provider, such as a cloud provider; searching records in a lookup table that includes APIs and associated resource data; or manual entry of the API, such as by a user selecting an API in a metadata association interface such as the interface 500 illustrated in FIG. 5.

By determining the API that is associated with the set of resources, mismatching of metadata to resources (e.g. associating metadata to a resource according to the API of the wrong cloud provider) may be reduced or avoided. As an example, if the configuration item data for a particular API has a resource group attribute that is in a particular format, such as an integer format of a particular length (e.g. a five-integer long identifier such as "29877"), then a resource group attribute "department seven" (which is textual not numeric) or a resource group attribute "298770" (that is six-integers long, not five-integers long) would be determined to be from a different API.

At operation 608, a user interface is generated and includes a descriptor or an indication (such as a graphical or audible output) of a set of resources such as the set of resources that was identified or discovered. The user interface may be configured to receive input including an input to select: a resource such as one or more of the set of resources; a descriptor of one or more of the resources; or a descriptor of various metadata including metadata derived from the descriptor.

The user interface may be generated by a computing device such as a server computing device that processes instructions for generating the interface. As an example, the server computing device may generate the interface based on instructions such HTML instructions, which may be received and interpreted by a client computing device that may then output the interface to an output device (e.g. an LCD display) which may display the interface in a web page displayed on the output device.

The user interface may be presented or displayed on an input device that is able to receive input to modify the user interface or the content presented in the user interface. The inputs to the input device may include at least one of: haptic inputs, such as a touch on a touch screen display; and audible inputs, such as spoken words that may be received by a microphone.

The user interface may include indications, such as descriptors, of the set of resources or metadata, such as graphical displays, which may be organized or arranged to indicate an association with the corresponding metadata. As an example, the association between the set of resources and the corresponding metadata may be displayed in a variety of ways including: listing the set of resources in the same row or column as the corresponding metadata (as illustrated in FIG. 5); or generating a visual indication, such as a surrounding border or connecting lines, to indicate the association between the set of resources and the corresponding metadata. Further, the user interface may include a graphical summary of the resources and corresponding metadata, such as a missing metadata report (e.g. missing tag report), which may include an indication of: a resource provider identity, such as a cloud provider name; cost centers associated with resources; projects associated with resources; services associated with resources; applications associated with resources; or users associated with resources.

The user interface may include one or more descriptors that are associated or derived from a set of metadata that may be associated with one or more resources. The one or more descriptors may include descriptors for at least one of: a provider, such as cloud provider; a cost center; a department; a project; a service; an application; and a user. In this way, a user may easily associate metadata with resources by using, for example, a drop down list with the indicators corresponding to the predetermined set of metadata.

Further, the generated interface can present the metadata and resources in a platform agnostic or cloud agnostic manner so that metadata and resources from disparate sources (e.g. different cloud providers, APIs, or environments) may be presented in a single interface.

At operation 610, a portion of the resources, such as the selected ones of the set of resources, can be associated with metadata derived from the selected descriptor. The metadata may indicate an association of resources, such as the selected ones of the set of resources, to one or more parameters. As an example, the one or more parameters can be related to or associated with at least one of: a provider, a cost center, a department, a project, a service, an application, a user, or another parameter relating to the provisioning of resources.

Further, the metadata derived from the selected descriptor may be associated with additional metadata. As an example, a descriptor for an accounting department may be displayed within a user interface as "accounting department," and may be associated with additional metadata including descriptors such as "main accounting department," "central accounting department," or "ACCT. DEPT." Accordingly, the association between the selected descriptor and the metadata may include metadata that is the same or similar to the selected descriptor.

The association of the resources to the metadata may include creating or modifying data that indicates a relationship between the resources and the metadata. The indication of the metadata may correspond to CI data, stored in a configuration management dataset (e.g. a CMDB), that indicates the association between the resources and the metadata in an environment of the computer network.

Configuration item data, including an association between each of the resources of the set of resources and the metadata, may be generated based on processes such as network discovery processes. The configuration item data may then be stored in one or more configuration management databases. In this way, the metadata may be used to manage the resources including tracking, provisioning, allocating, or discovering the resources. Associating the resources with the configuration item data may include modifying the configuration item data in a configuration management dataset to indicate that the resource is associated with corresponding metadata.

The resources, such as the set of resources, may be compared to the configuration item data in the configuration management dataset. As an example, based on a degree of matching or similarity between the resources and the corresponding configuration item data, resources that meet a similarity criterion or exceed a similarity threshold may be associated with corresponding metadata. As such the association of the metadata to the set of resources may be based on the comparison between the set of resources and the configuration item data. As an example, metadata may be associated with resources in a brown-field environment (e.g. legacy environment) in which discovered resources may not be (e.g., at the time of discovery) associated with corresponding applications, projects, cost centers, or users via, e.g., metadata such as tags.

Resources, such as a portion of the set of resources, may be organized or grouped into one or more groups based on the parameter. The grouping of the resources may be based on the resources in the groups having in common some metadata that includes the same or similar properties, values, or attributes. As an example, resources associated with metadata that includes a service department property to indicate the service department to which the resources are associated may indicate that one set of the resources is associated with a first service department (e.g. technical support) and that another set of resources is associated with a second service department (e.g. accounting). In this way, the resources may be grouped according to the metadata associated with the resources, thereby facilitating activities such as bulk association of metadata to resources.

Moreover, the resources may be grouped according to the parameter which can relate to the provisioning of resources and can include parameters relating to, or associated with, at least one of: a provider to identity a provider such as a cloud services provider or a cloud provider; a cost center to identify a unit in an organization to which costs may be allocated; a department; a project; a service; an application; and a user such as the name of a user or a group of users.

The groups may be platform agnostic or cloud agnostic so that the metadata associated with the resources are not wholly or partly, limited to one platform or a subset of platforms such as a single service platform, a cloud provider platform, or an application programming interface. Moreover, by associating resources with metadata or grouping resources with metadata in a platform or cloud agnostic manner, the correct metadata may be associated with the resources regardless of where the resources are located.

At operation 612, an event, such as an event associated with the environment of the computer network or an action that occurs in the environment, may be processed using a superset of resources including the set of resources and another set of resources that is provisioned to the computer network with metadata associated with the environment. As an example, an event may be related to one or more activities that occur in the environment and can include an action, alert, or notification (e.g. an alert message when a network condition is satisfied).

As an example, an application or hardware failure may trigger an event such as an alert of the failed application or hardware. Further, a process such as an impact calculation may be performed on the computer network in order to determine how a change in the provisioning or allocation of resources will impact the operation of the computer network. However, if the higher-level identity of resources (such as the department that is authorized to use a resource) is not known, then the impact calculation will be imprecise. As such, configuration item data that is associated with a superset of resources may be used to determine the identity of the resources that are unknown.

Accordingly, the disclosed technology may provide more effective management of resources, including cloud provider resources, through enhanced association of metadata with resources, such as bulk tagging.

Although the technique 600 is shown as a series of operations for clarity, implementations of the technique 600 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

All or a portion of the aspects of the systems and techniques described herein can be implemented using a general purpose computer/processor with a computer program that, when executed, carries out any of the respective techniques, algorithms, or instructions described herein. In addition, or alternatively, for example, a special-purpose computer/processor can be utilized, which can contain specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array, such as a field-programmable gate array (FPGA) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The embodiments herein can be described in terms of functional block components and various processing operations. Such functional block components can be realized by any number of hardware or software components that perform the specified functions. For example, the described embodiments can employ various integrated circuit components, e.g., memory elements, processing elements, logic elements, look-up tables, and the like, which can carry out a variety of functions under the control of one or more microprocessors or other control devices. Similarly, where the elements of the described embodiments are implemented using software programming or software elements, the systems and techniques can be implemented with any programming or scripting language such as C, C++, Java, assembler, or the like, with the various algorithms being implemented with a combination of data structures, objects, processes, routines, or other programming elements. Functional aspects can be implemented in algorithms that execute on one or more processors. Furthermore, the embodiments of the systems and techniques could employ any number of conventional techniques for electronics configuration, signal processing or control, data processing, and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise; or clearly indicated otherwise by the context to be directed to a singular form. Moreover, use of the term "an implementation" or the term "one implementation" throughout this disclosure is not intended to mean the same embodiment or implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, unless otherwise indicated, no item or component has to be included in order to practice the systems and techniques described herein.

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

The use of the terms "a," "an," and "the," and similar referents in the context of describing the systems and techniques (especially in the context of the following claims) should be construed to cover both the singular and the plural. Furthermore, unless otherwise indicated herein, the recitation of ranges of values herein is merely intended to serve as a shorthand alternative to referring individually to each separate value falling within the range, and each separate value is incorporated into the specification as if it were individually recited herein. Finally, the operations of all techniques described herein are performable in any suitable order unless otherwise indicated herein or clearly indicated otherwise by the context. The use of any and all examples, or exemplary language (e.g., "such as"), provided herein is intended merely to better illuminate the systems and techniques and does not pose a limitation on the scope of the systems and techniques unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising a server device including a memory and a processor, wherein the memory includes instructions executable by the processor to:
responsive to a performance of a network discovery of a computer network, identify a first resource and a second resource of a plurality of resources within the computer network, wherein the first resource originates from a first provider of a plurality of providers, and wherein the second resource originates from a second provider;
generate a user interface that is configured to receive inputs selecting the first resource, the second resource, and a descriptor for the first resource and the second resource;
generate metadata, in a configuration management dataset, for the first resource and the second resource based on the selected descriptor, wherein the metadata indicates an association of the first resource and the second resource to a parameter; and
send a first message to the first provider, wherein the first message includes a request for an identity of an application programming interface associated with the first provider, wherein the first resource is associated with the identity of the application program interface.

2. The system of claim 1, wherein the memory further includes instructions executable by the processor to:
determine a portion of the plurality of resources that is not associated with specified metadata in the configuration management dataset, wherein identifying the first resource and the second resource of the plurality of resources within the computer network is based on the portion of the plurality of resources within the computer network that is determined not to be associated with the specified metadata.

3. The system of claim 2, wherein the memory further includes instructions executable by the processor to:
generate configuration item data including an association between the plurality of resources and the metadata; and
store the configuration item data in the configuration management dataset.

4. The system of claim 3, wherein the memory further includes instructions executable by the processor to:
determine which of the plurality of resources matches the configuration item data based on a comparison between the plurality of resources and the configuration item data, wherein associating the metadata with the plurality of resources is based on the comparison between the plurality of resources and the configuration item data.

5. The system of claim 3, wherein the memory further includes instructions executable by the processor to:
determine an application programming interface associated with the metadata based on a comparison of attributes of the configuration item data to attributes associated with the plurality of resources.

6. The system of claim 1, wherein the memory further includes instructions executable by the processor to:
group the plurality of resources in the user interface into one or more platform agnostic groups based on the parameter, wherein the parameter is associated with at least one of a provider of the plurality of providers, a cost center, a department, a project, a service, an application, and a user, and wherein the platform agnostic groups include the first resource and the second resource of the plurality of resources.

7. The system of claim 1, wherein the memory further includes instructions executable by the processor to:
process an event associated with the parameter using a superset of resources including the plurality of resources and another resource that is provisioned to the computer network including the metadata associated with the parameter.

8. The system of claim 1, wherein the memory further includes instructions executable by the processor to send a second message to the second provider, wherein the second message includes a second request for a second identity of a second application programming interface associated with the second provider.

9. A method for associating computer resources with metadata, the method comprising:
responsive to a performance of a network discovery of a computer network, identifying a first resource and a second resource of a plurality of resources within the computer network, wherein the first resource originates from a first provider of a plurality of providers, and wherein the second resource originates from a second provider;
generating a user interface that is configured to receive inputs selecting the first resource, the second resource, and a descriptor for first resource and the second resource;
generating metadata, in a configuration management dataset, for the first resource and the second resource based on the selected descriptor, wherein the metadata indicates an association of the one or more resources to a parameter; and
sending a first message to the first provider, wherein the first message includes a request for an identity of an application programming interface associated with the first provider, wherein the first resource is associated with the identity of the application program interface.

10. The method of claim 9, further comprising:
determining a portion of the plurality of resources that is not associated with specified metadata in the configuration management dataset, wherein the identifying the first resource and the second resource of the plurality of resources within the computer network is based on the portion of the plurality of resources within the computer network that is determined not to be associated with the specified metadata.

11. The method of claim 10, further comprising:
generating configuration item data including an association between the plurality of resources and the metadata; and
storing the configuration item data in the configuration management dataset.

12. The method of claim 11, further comprising:
determining which of the plurality of resources matches the configuration item data based on a comparison between the plurality of resources and the configuration item data, wherein associating the metadata with the plurality of resources is based on the comparison between the plurality of resources and the configuration item data.

13. The method of claim 11, further comprising:
determining an application programming interface associated with the metadata based on a comparison of attributes of the configuration item data to attributes associated with the plurality of resources.

14. The method of claim 9, further comprising:
grouping the plurality of resources in the user interface into one or more platform agnostic groups based on the parameter, wherein the parameter is associated with at least one of a provider of the plurality of providers, a cost center, a department, a project, a service, an application, and a user, and wherein the platform agnostic groups include the first resource and the second resource of the plurality of resources.

15. The method of claim 9, further comprising:
processing an event associated with the parameter using a superset of resources including the plurality of resources and another resource that is provisioned to the computer network including the metadata associated with the parameter.

16. A non-transitory computer-readable storage medium, comprising executable instructions that, when executed by a processor, facilitate performance of operations, the operations comprising:
responsive to a performance of a network discovery of a computer network, identifying a first resource and a second resource of a plurality of resources within the computer network, wherein the first resource originates from a first provider of a plurality of providers, and wherein the second resource originates from a second provider;
generating a user interface that is configured to receive inputs selecting the first resource, the second resource, and a descriptor for the first resource and the second resource;
generating metadata, in a configuration management dataset, for the first resource and the second resource based on the selected descriptor, wherein the metadata indicates an association of the first resource and the second resource to a parameter; and
sending a first message to the first provider, wherein the first message includes a request for an identity of an application programming interface associated with the first provider, wherein the first resource is associated with the identity of the application program interface.

17. The non-transitory computer-readable storage medium of claim 16, further comprising executable instructions that, when executed by the processor, facilitate performance of operations, the operations comprising:
determining a portion of the plurality of resources that is not associated with specified metadata in the configuration management dataset, wherein the identifying the first resource and the second resource of the plurality of resources within the computer network is based on the portion of the plurality of resources within the computer network that is determined not to be associated with the specified metadata.

18. The non-transitory computer-readable storage medium of claim 17, further comprising executable instructions that, when executed by the processor, facilitate performance of operations, the operations comprising:
generating configuration item data including an association between the plurality of resources and the metadata; and
storing the configuration item data in the configuration management dataset.

19. The non-transitory computer-readable storage medium of claim 16, further comprising executable instructions that, when executed by the processor, facilitate performance of operations, the operations comprising:
processing an event associated with the parameter using a superset of resources including the plurality of resources and another resource that is provisioned to the computer network including the metadata associated with the parameter.

* * * * *